(12) United States Patent
Van Lerberghe

(10) Patent No.: US 6,583,912 B1
(45) Date of Patent: Jun. 24, 2003

(54) DISPLAY SYSTEM WITH LIGHT-EMITTING ELEMENTS

(75) Inventor: Steven Jan Willem Van Lerberghe, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/719,409
(22) PCT Filed: Apr. 12, 2000
(86) PCT No.: PCT/EP00/03334
§ 371 (c)(1), (2), (4) Date: Dec. 12, 2000
(87) PCT Pub. No.: WO00/62538
PCT Pub. Date: Oct. 19, 2000

(30) Foreign Application Priority Data

Apr. 13, 1999 (EP) .............................. 99200860
Mar. 3, 2000 (EP) .............................. 00200769

(51) Int. Cl.[7] .................................. G02B 26/08
(52) U.S. Cl. .................. 359/204; 359/205; 359/216; 359/224; 359/226
(58) Field of Search ............... 359/204, 205, 359/212–219, 223–224, 226; 348/755; 345/7, 32

(56) References Cited

U.S. PATENT DOCUMENTS 4,770,482 A * 9/1988 Sweeney et al.
4,934,773 A   6/1990 Becker
5,715,021 A * 2/1998 Gibeau et al. ............ 348/750
6,285,489 B1 * 9/2001 Helsel et al. ............. 359/291

FOREIGN PATENT DOCUMENTS

WO    WO 98/24240    * 6/1998

* cited by examiner

Primary Examiner—James Phan

(57) ABSTRACT

A display system comprises a linear array of light-emitting elements which can be driven in accordance with image information to be displayed, and a reflecting element provided with a reflecting surface arranged to rotate around a first axis and to reflect the rays coming from the linear array into an image-forming optical system for converting the light modulation into an image. The reflecting surface encloses an angle with the plane in which the first axis is situated.

23 Claims, 4 Drawing Sheets

DISPLAY SYSTEM WITH LIGHT-EMITTING ELEMENTS

The invention relates to a display system comprising a plurality of light-emitting elements which can be driven in accordance with image information to be displayed and are aligned with respect to each other in a well-defined manner, further comprising a rotating element having at least one reflecting surface, and an image-forming optical system for converting the light modulation generated by the light-emitting elements into an image.

A display system of the type described in the opening paragraph is known from, for example, U.S. Pat. No. 4,934,773. The display system described in this patent comprises a plurality of light-emitting elements to which image information is applied. To this end, the elements are driven selectively. The light-emitting elements, which are arranged in, for example, a linear array, are scanned by means of a vibratory mirror. This results in the projection of a plurality of picture elements on selected positions of the mirror. Since the mirror moves and, synchronized with each movement, drives the picture elements with different image information, a two-dimensional image is obtained.

It is an object of the present invention to provide a display system having an improved performance as compared with the display system of the type described in the opening paragraph.

To this end, the display system according to the invention is characterized in that the at least one reflecting surface encloses an angle with the plane in which the axis of rotation of the reflecting element is situated, the axis of rotation of said element being substantially perpendicular to the light path of the light-emitting elements.

The rotating element may be, for example, a reflecting element with a plane rotating between two extreme angles around an axis.

The rotating element may also comprise more than one reflecting surface. In this case, each light-emitting element is projected at a number of positions corresponding to the number of reflecting surfaces, due to the angle which is enclosed between the surfaces and the plane in which the axis of rotation is situated. The result is that the number of light-emitting elements can be reduced, or the same number of light-emitting elements can yield a larger number of image lines.

An embodiment of the display system according to the invention is characterized in that the reflecting surfaces of the rotating element are deformable in a direction substantially perpendicular to the direction of rotation.

Due to deformation of the reflecting surfaces in said direction, a magnification in a direction perpendicular to the direction in which the reflecting surfaces perform their scanning movement is made possible. Thus, this provides magnifications in two directions which are independent of each other.

A further embodiment of the display system according to the invention is characterized in that the image-forming optical system further comprises at least one deformable mirror.

This element provides an extra possibility of adapting the shape of the image before it is projected.

A simple embodiment of the display system according to the invention is characterized in that the light-emitting elements are arranged in a linear array.

A further embodiment of the display system according to the invention is characterized in that the number of light-emitting elements for at least one color is smaller than for the other colors.

By choosing the suitable number of light-emitting elements per color, the resolution is improved considerably.

The human eye has a different sensitivity to the spatial resolution of the different colors. This means that, for those colors for which the sensitivity is lower than for another color, it is sufficient to use fewer light-emitting elements for the color for which the sensitivity is lower.

A further embodiment of the display system according to the invention is characterized in that the light-emitting elements are arranged in linear arrays, and the arrays of the same color are longitudinally offset with respect to each other.

This embodiment relates to a color display system in which the light-emitting elements are arranged in linear arrays and in which the resolution is improved. Two successive arrays of the same color are longitudinally offset with respect to each other. Two successive arrays are preferably offset through half a pitch between the light-emitting elements.

A further embodiment of the display system according to the invention is characterized in that the linear arrays are made of one piece.

This is realized by cutting a one-piece array from one wafer. Advantages are, inter alia, a simple, compact implementation of the array and the omission of mutual positioning and alignment of discrete elements.

A further embodiment of the display system according to the invention is characterized in that the display system is provided with a number of light guides corresponding to the number of light-emitting elements.

By making use of, for example, optical fibers, the array of picture elements to be scanned can be made smaller in the case of relatively large light-emitting elements. Moreover, transport of light through an optical fiber allows great freedom of positioning the light-emitting elements.

A further embodiment of the display system according to the invention is characterized in that the light-emitting elements are pulsed lasers, in which the image information for two adjacent light-emitting elements can be supplied at different instants within the period of forming the image.

In this way, crosstalk between adjacent picture elements is reduced considerably.

A further embodiment of the display system according to the invention is characterized in that a plurality of light-emitting elements jointly constitutes a single picture element, the display system comprising feedback means for driving the light-emitting elements within a picture element to a predetermined drive level per picture element.

Each picture element consists of a number of light-emitting elements which receive the same image information per picture element. The drive level is determined for each picture element. The feedback means ensures that, with reference to the number of functioning light-emitting elements, this drive level within the same picture element is achieved for each picture element. In this way, the risk of non-functioning or malfunctioning picture elements in the image is reduced considerably.

These and other aspects of the invention are apparent from and will be elucidated with reference to the embodiments described hereinafter.

Figure 5:
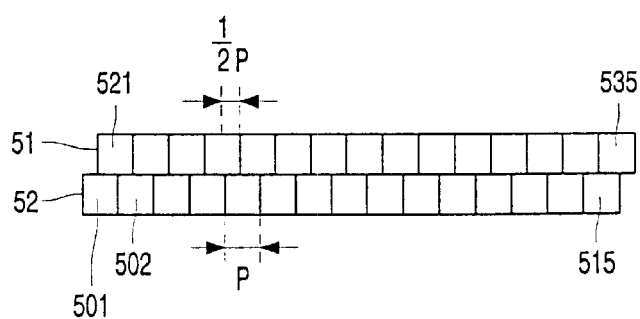
Figure 6:
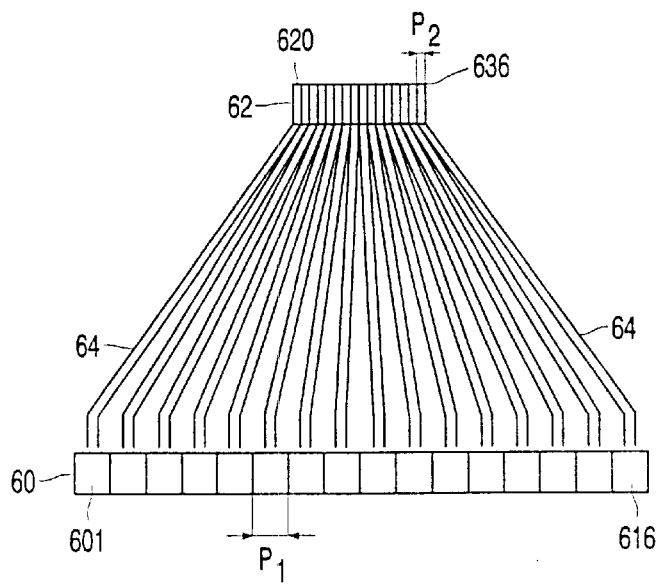
Figure 7:
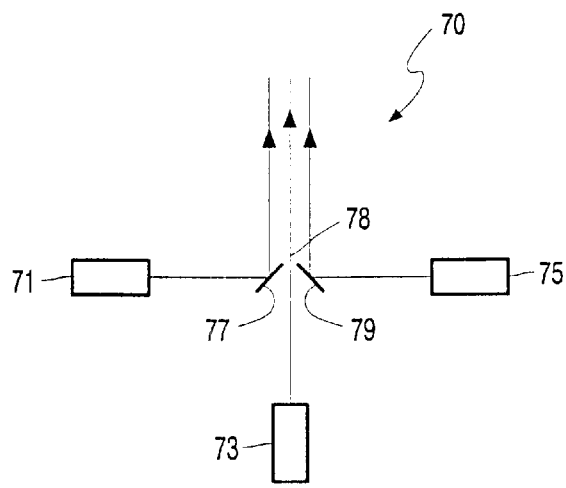
Figure 8:
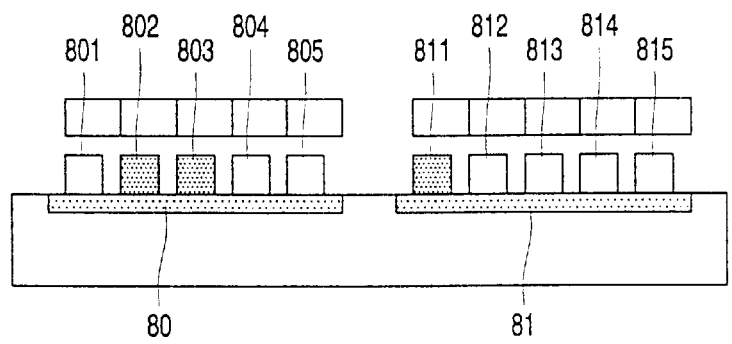
Figure 9:
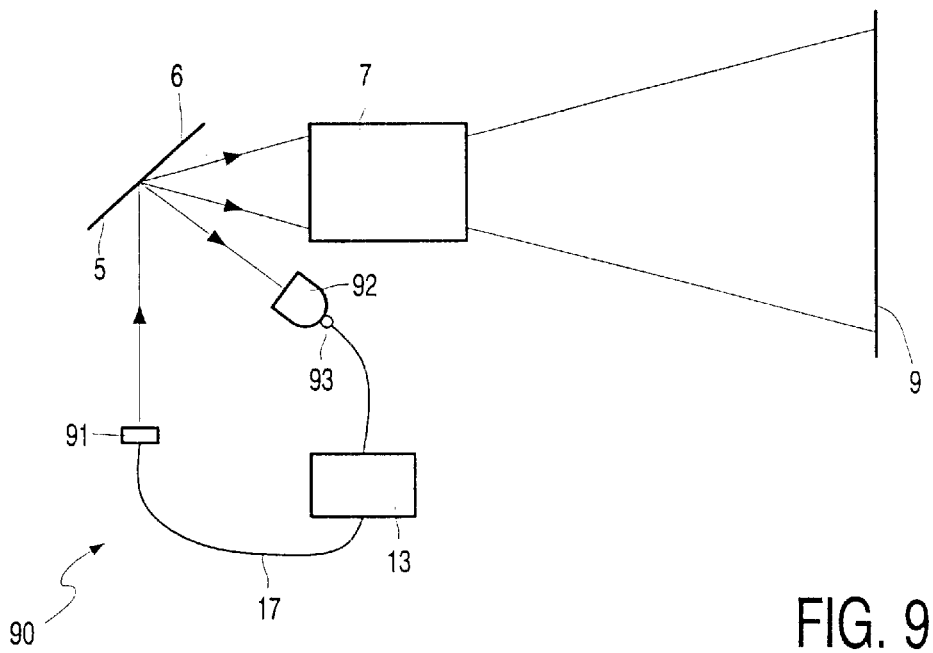

FIG. 5 shows an example of two staggered linear arrays of light-emitting elements, FIG. 6 shows an example of a linear array of light-emitting elements with a reduced pitch comprising light guides, FIG. 7 shows an example of a linear array of light-emitting elements comprising dichroic mirrors to combine red, green and blue light rays from light-emitting elements, FIG. 8 shows an embodiment of a part of an array of light-emitting elements, in which a picture element comprises a plurality of light-emitting elements, and FIG. 9 shows an embodiment of a display system comprising feedback means and a linear array of picture elements each comprising a plurality of light-emitting elements.

Figure 1:
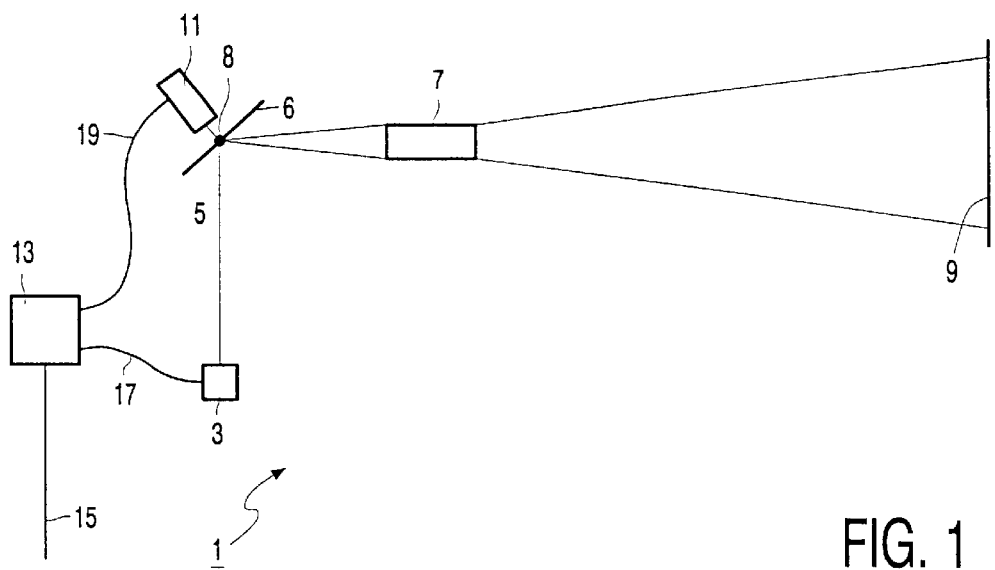
FIG. 1 shows an embodiment of a display system according to the invention.

FIG. 1 shows a display system according to the invention. The display system 1 comprises a plurality of light-emitting elements, for example, a linear array 3 of semiconductor lasers, a reflecting element 5 having a reflecting surface 6 and rotating around an axis of rotation 8 and an image-forming optical system 7 for converting the light modulation generated by the laser array into an image, which can be projected on a screen 9. The linear array 3 comprises, for example, 289 laser elements. In this example, a single laser element has a length of 300 micrometers and a pitch of 50 micrometers between two consecutive laser elements. Furthermore, the image display system 1 comprises a control system 13 for generating image signals 17 and control signals 19. The image signals are sent to the linear array 3 and the control signals 19 are sent to the rotating reflecting element 5 in order to synchronize the rotation of the reflecting element 6 so as to form an image consisting of projected lines. In operation, the control system 13 is connected to a television receiver of a personal computer to display information from those devices. Furthermore, in this example, the reflecting surface 6 rotates around the vertical axis 8 substantially perpendicularly to a light path extending from the laser array 3 via the reflective surface 6 and the optical system 7 towards the screen 9. In this way, the image is built up in lines extending in a horizontal direction, and the lines may correspond to, for example, 256 image elements in the horizontal direction of the image. In order to build up the image in the vertical direction and parallel to the direction of the axis of rotation 8, the reflecting element 6 is coupled to a linear actuator 11, for example, a piezo-linear actuator. The linear actuator 11 moves the reflecting surface 6 between a predetermined first and a second extreme angle. In this way, the number of lines in the vertical direction is doubled. Normally, an image frame is interlaced by odd lines forming a first field and even lines forming a second field. For example, a PAL image comprises 625 lines, the first field comprises 288 lines and the second field comprises 287 lines.

Figure 2A:
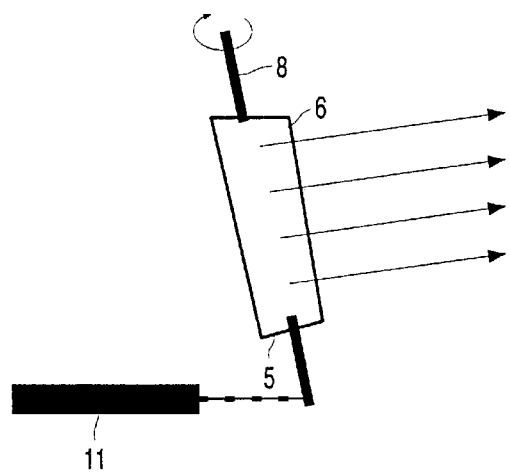
FIG. 2 shows a rotating reflecting element in which the reflecting element has a surface.
Figure 2B:
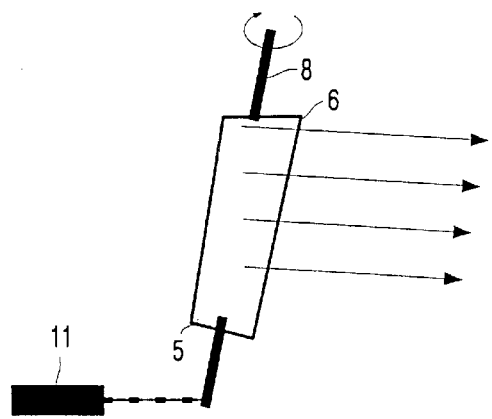

FIG. 2 shows a reflecting element comprising a reflecting surface and a linear actuator. Position 1 of FIG. 2 corresponds to the first extreme angle, in which position the piezo-actuator 11 is extended and the reflecting surface 6 is tilted upwards at an angle $\alpha_1$ to the plane in which the axis of rotation is situated and the rays are projected to even lines 110–114 to form the first field. In position (b), the piezo-actuator 11 is contracted and the reflecting surface 6 is tilted downwards at an angle $\alpha_2$ to the plane in which the axis of rotation is situated and the rays are projected to odd lines 120–124 to form the second field. The first and second extreme angles $\alpha_1, \alpha_2$ are determined in such a way that the reflecting surface 6 is at the second extreme angle $\alpha_2$. The odd lines of the second field are built up between the positions of the even lines building up the first field when the reflecting surface is at the first extreme angle $\alpha_1$. Thus, an interlaced image is formed.

In order to reduce the number of light sources of the linear array or to increase the numbers of lines building up the image, the reflecting element may comprise more than one reflecting surface.

Figure 3A:
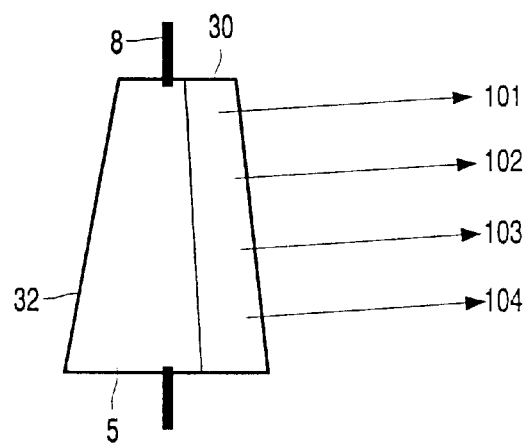
FIG. 3 shows an embodiment of a display system according to the invention, in which the reflecting element has a plurality of reflecting surfaces.
Figure 3B:
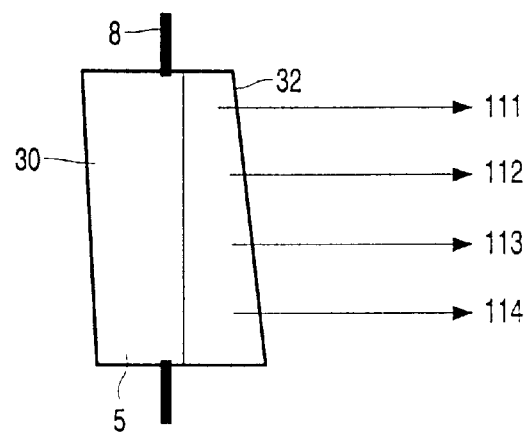
Figure 3C:
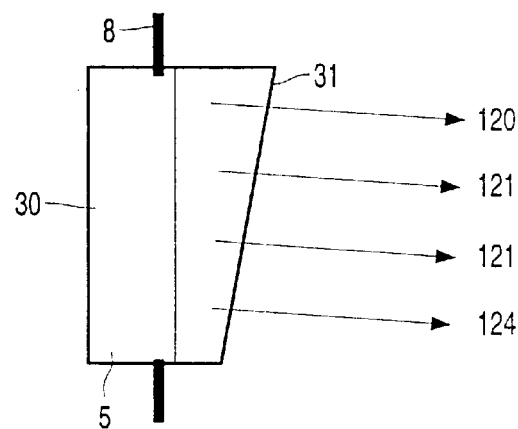

FIG. 3 shows an example of such a reflecting element 5 comprising three reflecting surfaces 30,31,32. A first reflecting surface 30 defines a first angle $\alpha_1$, to the plane in which the axis of rotation is situated, a second reflecting surface 31 defines a second angle $\alpha_2$ to the plane in which the axis of rotation is situated and a third reflecting surface 32 defines a third angle $\alpha_3$ to the plane in which the axis of rotation is situated. In order to display an image on the screen 7 in this example, the control system 13 divides the image into three respective sub-frames comprising an equal number of lines. In a PAL image, the number of lines is, for example, 625 and the number of light sources of the linear array is 200. The number of lines for each sub-frame is then 200. The image information of the lines of respective sub-frames is then sent to the linear array 3 synchronized with the rotation of the respective reflective elements 30,31,32 so that the image is formed on the screen 7. In FIG. 3, in position (a) of the reflecting element 6, the first reflecting surface 30 extends at an angle $\alpha_1$ to the plane in which the axis of rotation is situated, and the rays coming from the linear array 3 and reflected from this reflecting surface 30 project the lines of the first sub-frame denoted 101 . . . 104. In position (b) of the reflecting element 5, the second reflecting surface 31 extends at an angle $\alpha_2$ to the plane in which the axis of rotation is situated, and the rays coming from the linear array 3 and reflected from the second reflecting surface 31 project the lines of the second sub-frame denoted 101 . . . 114. In position (c) of the reflecting element 5, the third reflecting surface 32 extends at an angle $\alpha_3$ to the plane in which the axis of rotation is situated, and the rays coming from the linear array 3 and reflected from the third surface 32 project the lines of the third sub-frame denoted 121 . . . 124. In this way, a complete image comprising 600 lines is built up.

In order to obtain a magnification in the vertical direction, which is independent of the magnification in the horizontal direction, i.e. the direction in which the reflecting surfaces perform their scanning movement, the reflecting surfaces are deformable in a direction perpendicular to the axis of rotation.

Figure 4A:
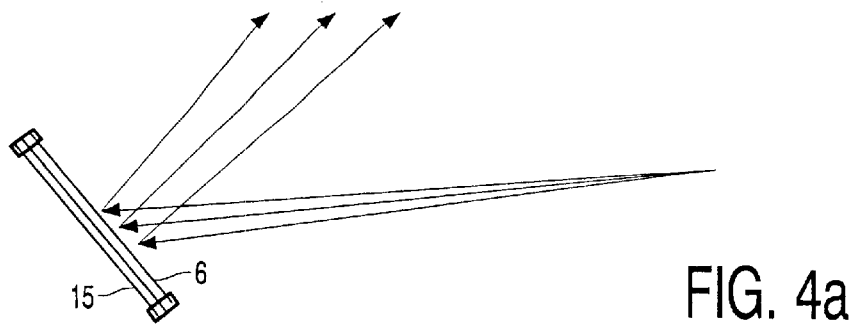
FIG. 4 shows the effect on a light beam of a deformable mirror.
Figure 4B:
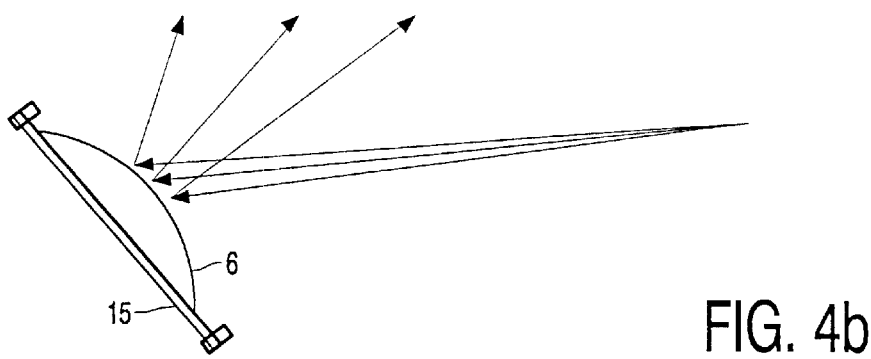

FIG. 4 shows an example of a deformable reflection element. In position (a) of the reflecting element 5, the reflecting element has a flat reflecting surface 6 and acts as a plane mirror. The magnification of the image in the vertical direction is then determined by the optical system 7 of the display system. In position (b) of the reflecting element 5, the reflecting surface 6 is curved in a vertical plane, thus perpendicular to the direction of rotation. The radius of the curved surface 6, together with the optical system 7, then defines the magnification in the vertical direction. A clamping means, in this example a screwing clamp 15, is connected to both ends of the reflecting surface 6 to deform the reflecting surface in the desired curve. Furthermore, in order to adapt the shape of the image before it is projected, the image-forming optical system 7 may comprise a further deformable mirror.

In this example, the linear array 3 comprises red, green and blue light laser diodes. Alternatively, an array of light-emitting diodes can be applied. Such a linear array can be obtained from Nichia. In order to reduce the total number of elements of the linear array 3, the ratio between the red, green and blue elements may be chosen to be different from 1:1:1. Because of the different sensitivity of the human eye to red, green and blue light, the number of elements can be reduced accordingly. The ratio may be changed to, for example, 1:2/3:1/10. In this example, the number of green elements is 200, the number of red elements is, 133 and the number of blue elements is 20. Alternatively, the adaptation of said ratio may be used to improve the resolution of the display system.

The linear array 3 is preferably integrated on a single substrate and a single piece array may be cut from a wafer.

When the linear array comprises an array of laser elements integrated on a single substrate, it is preferred that the image information is sent to two adjacent laser elements at different instants within the period of forming the image. In this way, crosstalk between the adjacent laser elements can be reduced. For example, the even lines of the image can be formed by projecting rays coming from even-numbered laser elements of the linear array, and the odd lines of the image can be formed by projecting rays coming from odd-numbered laser elements.

In order to improve the resolution, linear arrays of light-emitting elements of the same color are longitudinally offset with respect to each other.

FIG. 5 shows a configuration of two linear arrays 50,51 having respective light-emitting elements 501 . . . 515 and 520 . . . 535, wherein the pitch p between two light-emitting elements 501,502 is, for example, 50 micrometers. The linear arrays 50,51 are longitudinally offset through a distance of half a pitch p between two neighboring light-emitting elements 501,502 through a distance of 25 micrometers.

In order to reshape the dimensions of a linear array of light-emitting elements in such a way that it fits in a desired configuration, use can be made of light guides, for example, optical fibers or an optical system comprising mirrors. For example, when the pitch of the light-emitting elements is larger than a required pitch of the scanning array, the pitch can be reduced by applying a number of light guides corresponding to the number of light-emitting elements.

FIG. 6 shows an example of a linear array 60 with 16 light-emitting elements and 16 optical fibers. The linear array 60 has a pitch P1 of 50 micrometers and each optical fiber 64 has a diameter D of 12.5 micrometers. This results in a pitch P2 of 12.5 micrometers between two light-emitting elements 620,621 of the scanning array 62. A further advantage is that the optical fibers 64 allow freedom of positioning of the linear array 60 of light-emitting elements with respect to the reflecting element 5.

FIG. 7 shows another example of a linear array of light-emitting elements using mirrors in order to form a compact linear array of light-emitting elements. The linear array 70 of light-emitting elements comprises three linear arrays 71,73,75 of red, green and blue light-emitting elements. Furthermore, first and second mirrors 77,79 separated by a gap 78 of about 300 micrometers, serve as recombination means to combine the rays coming from the respective red, green and blue linear arrays 71,73,75. The first mirror 77 reflects the rays from the red linear array 71. The second mirror 79 reflects the rays from the blue linear array 75. The green rays from the green linear array 73 pass through the gap 78.

In order to reduce the influence of malfunctioning picture elements of the linear array of laser elements, each picture element may consist of multiple light-emitting elements.

FIG. 8 shows an example of two picture elements of such a linear array, wherein each picture element consists of five light-emitting elements. A first picture element 80 comprises five light-emitting elements 801,802,803,804,805. The other picture element 81 also comprises five light-emitting elements 811,812,813,814,815. In this example, two of the light-emitting elements of the first picture element 81 are malfunctioning during operation. These light-emitting elements 802,803 are shaded in FIG. 8 and one of the light-emitting elements of the second picture element 81 is malfunctioning. This light-emitting element 811 is also shaded. In order to obtain a desired light level, more power is supplied to the properly functioning light-emitting elements 801,804,805,812,813,814,815 of the two picture elements 80,81 to take over and compensate the light output from the malfunctioning light-emitting elements. The display system is provided with a feedback system to control the light output of the individual picture elements of the linear array. This feedback system comprises a control loop and light-detecting means, for example, a photodiode.

FIG. 9 shows an example of a display system comprising such a linear array of light-emitting elements and a feedback loop. The display system 90 comprises a first linear array 91 of picture elements, wherein each picture element is formed by five light-emitting elements, a reflecting element 5 provided with two reflecting surfaces 6 and a light guide 92 and photodiode 93, an image-forming optical projection system 7 and a screen 9. The photodiode 93 is connected to the control system 13. In operation, the reflecting surfaces 6 of the reflecting element 5 reflect the light rays from the first linear array 91 via the image-forming projection system 7 to a screen 9 in each cycle, and via the light guide 92 to the photodiode 93 at the end of each cycle. At the end of the cycle, the control system 13 supplies a reference power to each light-emitting element forming the picture elements of the first linear array 91, and the photodiode 93 measures an actual light output of the picture elements of the first linear array 91 and sends the measured light outputs to the control system 13. The feedback loop of the control system 13 then calculates corrections on the basis of the power supplied to each light-emitting element and the measured light output of the picture elements. These corrections are used to calculate the power to be supplied to the different light-emitting elements of each picture element of the first linear array 91 so as to obtain a desired light output from the picture elements in accordance with the image information. Thus, when one or more light-emitting element malfunctions, this feedback loop maintains the desired light output of a picture element by supplying more power to the other light-emitting elements forming said picture element.

What is claimed is:

1. A display system comprising:
    a plurality of light-emitting elements which can be driven in accordance with image information to be displayed and are aligned with respect to each other in a well-defined manner;
    a rotating element having at least one reflecting surface; and
    an image-forming optical system for converting the light modulation generated by the light-emitting elements into an image, wherein:
    the at least one reflecting surface encloses an angle with the plane in which the axis of rotation of the reflecting element is situated, the axis of rotation of said element being substantially perpendicular to the light path of the light-emitting elements; and
    the at least one reflecting surface of the rotating element is deformable in a direction substantially perpendicular to the direction of rotation.

2. A display system as claimed in claim 1, characterized in that the light-emitting elements are arranged in a linear array.

3. A display system as claimed in claim 2, characterized in that the linear arrays are made of one piece.

4. The display system of claim 2, in which the display system is a color display system, and wherein the number of light-emitting elements for at least one color is smaller than for the other colors.

5. A display system as claimed in claim 1, in which the display system is a color display system, characterized in that the number of light-emitting elements for at least one color is smaller than for the other colors.

6. A display system as claimed in claim 5, characterized in that the light-emitting elements are arranged in linear arrays, and in that the arrays of the same color are longitudinally offset with respect to each other.

7. A display system as claimed in claim 1, characterized in that the display system is provided with a number of light guides corresponding to the number of light-emitting elements.

8. A display system as claimed in any claim 1, characterized in that the light-emitting elements are pulsed lasers, in which the image information for two adjacent light-emitting elements can be supplied at different instants within the period of forming the image.

9. A display system as claimed in claim 1, characterized in that a plurality of light-emitting elements jointly constitutes a single picture element, the display system comprising feedback means for driving the light-emitting elements within a picture element to a predetermined drive level per picture element.

10. A display system comprising a plurality of light-emitting elements which can be driven in accordance with image information to be displayed and are aligned with respect to each other in a well-defined manner, further comprising a rotating a element having at least one reflecting surface, and an image-forming optical system for converting the light modulation generated by the light-emitting elements into an image, characterized in that the at least one reflecting surface encloses an angle with the plane in which the axis of rotation of the reflecting element is situated, the axis of rotation of said element being substantially perpendicular to the light path of the light-emitting elements, wherein a plurality of reflecting surfaces of the rotating element are deformable in a direction substantially perpendicular to the direction of rotation.

11. The display system of claim 10, wherein the image-forming optical system includes at least one deformable mirror.

12. The display system of claim 10, wherein the light-emitting elements are arranged in a linear array.

13. The display system of claim 10, in which the display system is a color display system, and wherein the number of light-emitting elements for at least one color is smaller than for the other colors.

14. The display system of claim 10, wherein the display system is provided with a number of light guides corresponding to the number of light-emitting elements.

15. The display system of claim 10, wherein the light-emitting elements are pulsed lasers, in which the image information for two adjacent light-emitting elements can be supplied at different instants within the period of forming the image.

16. The display system of claim 10, wherein a plurality of light-emitting elements jointly is comprised by a single picture element, the display system comprising feedback means for driving the light-emitting elements within a picture element to a predetermined drive level per picture element.

17. A display system comprising a plurality of light-emitting elements which can be driven in accordance with image information to be displayed and are aligned with respect to each other in a well-defined manner, further comprising a rotating element having at least one reflecting surface, and an image-forming optical system for converting the light modulation generated by the light-emitting elements into an image, characterized in that the at least one reflecting surface encloses an angle with the plane in which the axis of rotation of the reflecting element is situated, the axis of rotation of said element being substantially perpendicular to the light path of the light-emitting elements, wherein the image-forming optical system further comprises at least one deformable mirror.

18. The display system of claim 17, wherein the light-emitting elements are arranged in a linear array.

19. The display system of claim 18, in which the display system is a color display system, and wherein the number of light-emitting elements for at least one color is smaller than for the other colors.

20. The display system of claim 17, in which the display system is a color display system, and wherein the number of light-emitting elements for at least one color is smaller than for the other colors.

21. The display system of claim 17, wherein the display system is provided with a number of light guides corresponding to the number of light-emitting elements.

22. The display system of claim 17, wherein the light-emitting elements are pulsed lasers, in which the image information for two adjacent light-emitting elements can be supplied at different instants within the period of forming the image.

23. The display system of claim 17, wherein a plurality of light-emitting elements jointly is comprised by a single picture element, the display system comprising feedback means for driving the light-emitting elements within a picture element to a predetermined drive level per picture element.

* * * * *